United States Patent
Kim et al.

(10) Patent No.: US 10,609,730 B2
(45) Date of Patent: Mar. 31, 2020

(54) NAV OPERATION METHOD IN WIRELESS LAN SYSTEM AND STATION APPARATUS FOR SAME

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 15/751,142

(22) PCT Filed: Aug. 11, 2016

(86) PCT No.: PCT/KR2016/008857
§ 371 (c)(1),
(2) Date: Feb. 7, 2018

(87) PCT Pub. No.: WO2017/026824
PCT Pub. Date: Feb. 16, 2017

(65) Prior Publication Data

US 2018/0242362 A1 Aug. 23, 2018

Related U.S. Application Data

(60) Provisional application No. 62/207,392, filed on Aug. 20, 2015, provisional application No. 62/206,860, (Continued)

(51) Int. Cl.
*H04W 74/08* (2009.01)
*H04W 24/10* (2009.01)
(Continued)

(52) U.S. Cl.
CPC ....... *H04W 74/0816* (2013.01); *H04W 24/10* (2013.01); *H04W 48/16* (2013.01);
(Continued)

(58) Field of Classification Search
None
See application file for complete search history.

(56) References Cited

U.S. PATENT DOCUMENTS

2014/0119303 A1 5/2014 Kwon et al.
2015/0078299 A1 3/2015 Barriac et al.
(Continued)

FOREIGN PATENT DOCUMENTS

KR 1020150060706 6/2015
WO 2014190284 11/2014
WO 2015112780 7/2015

OTHER PUBLICATIONS

PCT International Application No. PCT/KR2016/008857, Written Opinion of the International Searching Authority dated Nov. 15, 2016, 17 pages.

*Primary Examiner* — Lonnie V Sweet
(74) *Attorney, Agent, or Firm* — Lee Hong Degerman Kang & Waimey

(57) ABSTRACT

Provided is a network allocation vector (NAV) operation method by a station (STA) operating in a wireless LAN (WLAN) system. An STA receiving a particular frame, if the frame is a frame for a basic service set (BSS) to which the corresponding STA belongs, determines whether or not a received signal strength indicator (RSSI) is higher than the first clear channel assessment (CCA) level and, if the corresponding frame is not a frame for a BSS to which the STA belongs, determines if the RSSI is higher than the second CCA level which is higher than the first CCA level. If the RSSI is higher than the first CCA level or the second CCA level, the STA updates NAV. If the received frame is a
(Continued)

request to send (RTS) frame or a clear to send (CTS) frame, the received frame comprises additional information used for determining whether or not the RTS frame or the CTS frame is a frame for a BSS to which the STA belongs.

8 Claims, 12 Drawing Sheets

Related U.S. Application Data filed on Aug. 19, 2015, provisional application No. 62/203,923, filed on Aug. 12, 2015.

(51) Int. Cl.
*H04W 48/16* (2009.01)
*H04W 74/00* (2009.01)
*H04W 84/12* (2009.01)

(52) U.S. Cl.
CPC ........ *H04W 74/085* (2013.01); *H04W 74/002* (2013.01); *H04W 84/12* (2013.01)

(56) References Cited

U.S. PATENT DOCUMENTS

| | | | |
|---|---|---|---|
| 2015/0201401 A1* | 7/2015 | Lahetkangas | H04L 1/0079 370/329 |
| 2016/0143058 A1* | 5/2016 | Son | H04B 17/318 370/329 |
| 2016/0360549 A1* | 12/2016 | Tayamon | H04W 56/0005 |

\* cited by examiner

NAV OPERATION METHOD IN WIRELESS LAN SYSTEM AND STATION APPARATUS FOR SAME

CROSS-REFERENCE TO RELATED APPLICATIONS

This application is the National Stage filing under 35 U.S.C. 371 of International Application No. PCT/KR2016/008857, filed on Aug. 11, 2016, which claims the benefit of U.S. Provisional Application No. 62/203,923, filed on Aug. 12, 2015, 62/206,860, filed Aug. 19, 2015 and 62/207,392, filed Aug. 20, 2015, the contents of which are all hereby incorporated by reference herein in their entirety.

TECHNICAL FIELD

The following description relates to a network allocation vector (NAV) operation method for increasing a spatial reuse rate in a wireless local area network (LAN) system and a station apparatus therefor.

BACKGROUND ART

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An IEEE 802.11ax system and systems to be developed subsequently thereto need to support a dense wireless environment supporting more users in a predetermined geographical area. Accordingly, technology for increasing a spatial reuse rate in order to support such a wireless environment is necessary.

Accordingly, there is a need for research into technology for increasing a spatial reuse rate in a clear channel assessment (CCA) based network allocation vector (NAV) operation method used to solve collision upon conventional media access.

Technical Solution

The object of the present invention can be achieved by providing a method of operating a network allocation vector (NAV) of a first station (STA) operating in a wireless local area network (WLAN) system including receiving a first frame from a second STA, determining whether a received signal strength indicator (RSSI) of the first frame is equal to or greater than a first clear channel assessment (CCA) level when the first frame is a frame of a basic service set (BSS), to which the first STA belongs, and determining whether the RSSI of the first frame is equal to or greater than a second CCA level higher than the first CCA level when the first frame is not the frame of a BSS, to which the first STA belongs, and updating the NAV of the first STA when the RSSI of the first frame is equal to or greater than the first CCA level or the second CCA level, wherein, when the first frame is a request to send (RTS) frame or a clear to send (CTS) frame, the RTS frame or the CTS frame includes additional information used to determine whether the RTS frame or the CTS frame is the frame of the BSS, to which the first STA belongs.

The RTS frame or the CTS frame may include a BSSID as the additional information.

When the first frame is the CTS frame, the CTS frame may include an indicator indicating whether the CTS frame includes a BSSID as the additional information.

When the CTS frame is a CTS frame transmitted on uplink, the indicator may have a first value and, when the CST frame is a CTS frame transmitted on downlink, the indicator may have a second value.

When the indicator has the first value, the first STA may determine whether the CTS frame is the frame of the BSS, to which the first STA belongs, through the BSSID included in a receiver address (RA) of the CTS frame and compare the RSSI of the CTS frame with the first CCA level or the second CCA level, and, when the indicator has the second value, the first STA may compare the RSSI of the CTS frame with the second CCA level.

The CTS frame may include BSS color information as the additional information.

At this time, the CTS frame includes a frame control field having a length of 16 bits, and the BSS color information may be included as a predetermined number of pieces of bit information among bits after an eighth bit of the 16-bit information.

The CTS frame may further include a field indicating whether the BSS color is present or not.

In another aspect of the present invention, provided herein is a first station (STA) apparatus operating in a wireless local area network (WLAN) system including a transceiver configured to receive a first frame from a second STA and a processor connected to the transceiver and configured to control network allocation vector (NAV) operation, wherein the processor is configured to determine whether a received signal strength indicator (RSSI) of the first frame is equal to or greater than a first clear channel assessment (CCA) level when the first frame is a frame of a basic service set (BSS), to which the first STA belongs, to determine whether the RSSI of the first frame is equal to or greater than a second CCA level higher than the first CCA level when the first frame is not a frame of the BSS, to which the first STA belongs, and to update the NAV of the first STA when the RSSI of the first frame is equal to or greater than the first CCA level or the second CCA level, and wherein, when the first frame is a request to send (RTS) frame or a clear to send (CTS) frame, the RTS frame or the CTS frame includes additional information used to determine whether the RTS frame or the CTS frame is the frame of the BSS, to which the first STA belongs.

The processor may be further configured to use a BSSID of the RTS frame or the CTS frame as the additional information.

When the first frame is the CTS frame, the processor may be further configured to use an indicator indicating whether the CTS frame includes a BSSID in the CTS frame as the additional information.

When the CTS frame is a CTS frame transmitted on uplink, the indicator may have a first value and, when the CST frame is a CTS frame transmitted on downlink, the indicator may have a second value.

When the indicator has the first value, the processor may be further configured to determine whether the CTS frame is the frame of the BSS, to which the first STA belongs, through the BSSID included in a receiver address (RA) of the CTS frame and compare the RSSI of the CTS frame with the first CCA level or the second CCA level, and, when the indicator has the second value, the processor may compare the RSSI of the CTS frame with the second CCA level.

The processor may be further configured to use BSS color information of the CTS frame as the additional information.

The CTS frame may include a frame control field having a length of 16 bits, and the BSS color information may be included as a predetermined number of pieces of bit information among bits after an eighth bit of the 16-bit information.

Advantageous Effects

According to the present invention, it is possible to efficiently avoid collision between STAs while increasing a spatial reuse rate as compared to a conventional CCA based NAV operation method.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a network allocation vector (NAV) operation method for increasing a spatial reuse rate in a wireless local area network (LAN) system and a station apparatus therefor. To this end, first, a wireless LAN system, to which the present invention is applied, will be described in detail.

Figure 1:
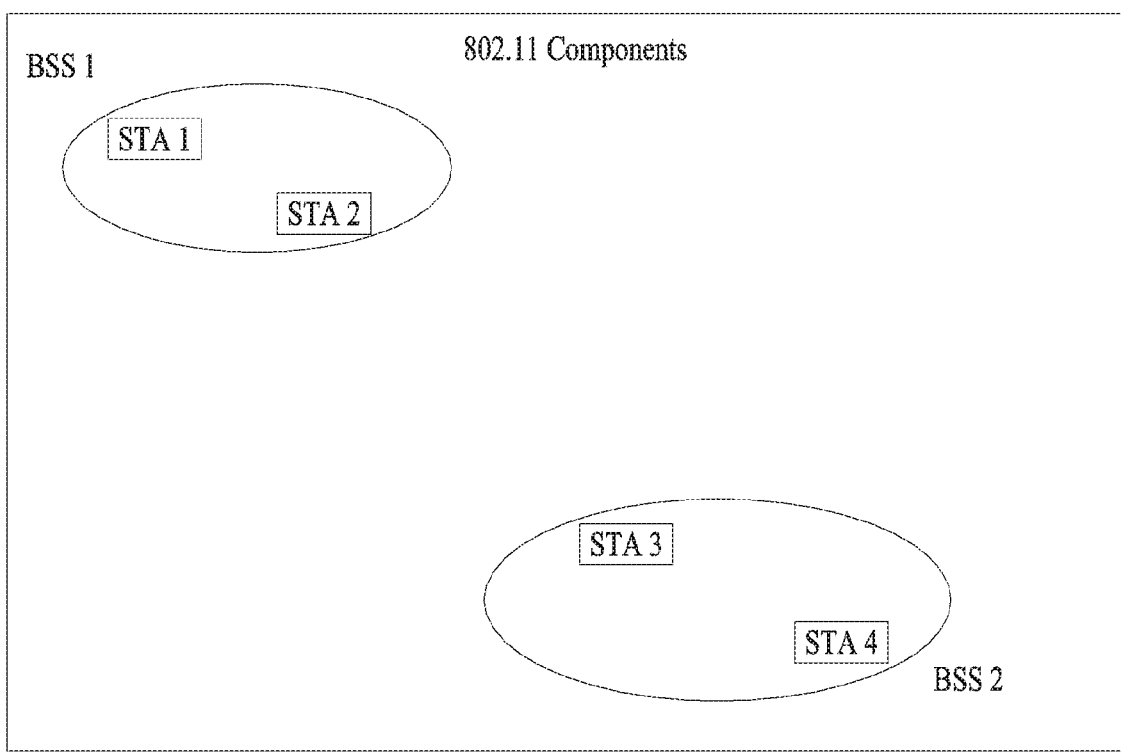
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
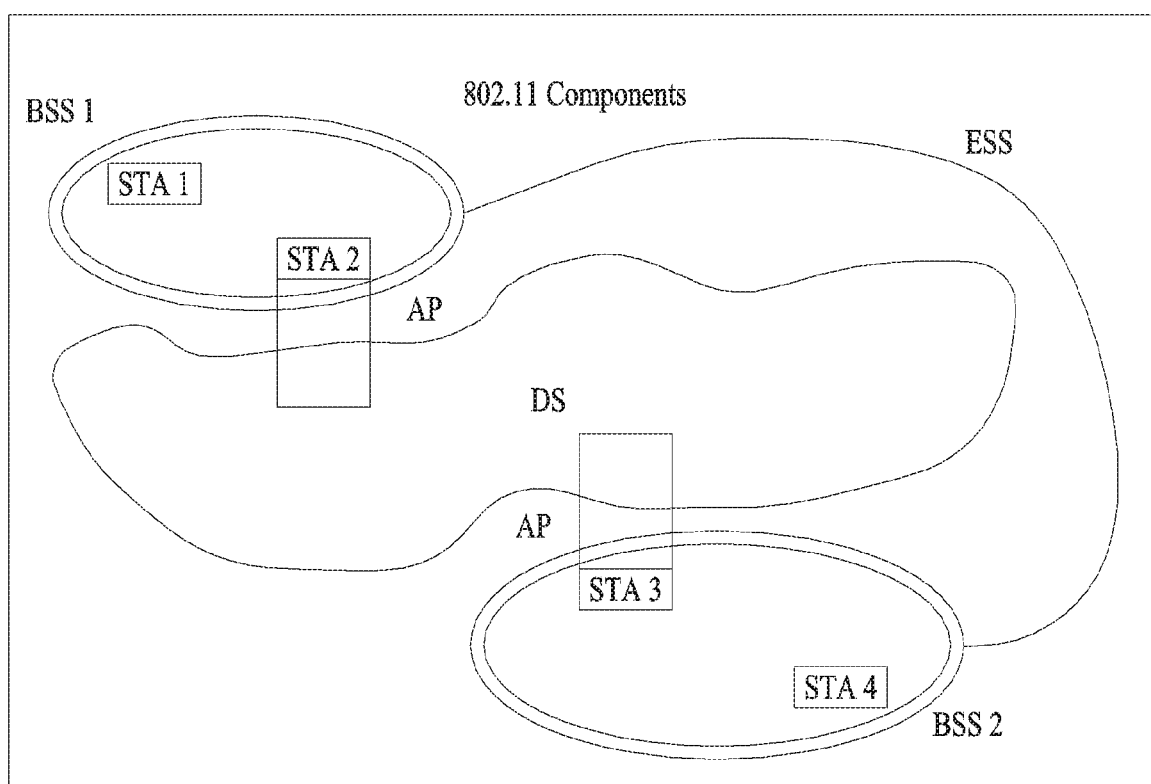
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, collision detection technology in a wireless LAN system will be described.

As described above, since various factors influence a channel in a wireless environment, a transmitter cannot accurately perform collision detection. Therefore, in 802.11, a distributed coordination function (DCF) which is a carrier sense multiple access/collision avoidance (CSMA/CA) mechanism was introduced.

Figure 3:
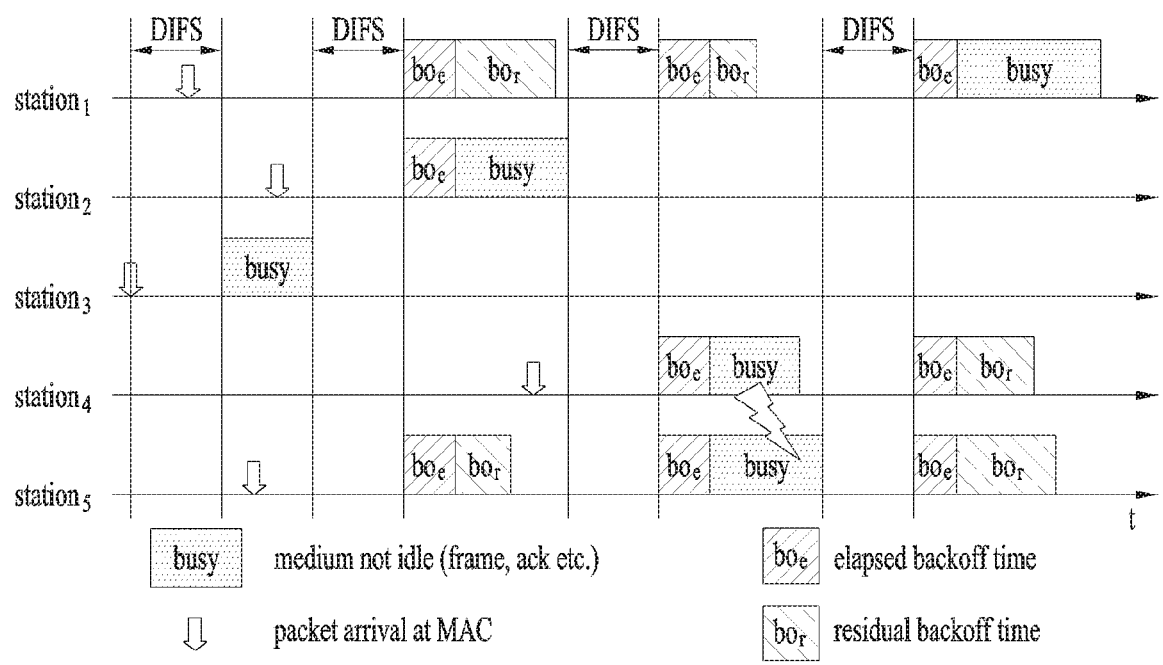
FIG. 3 is a diagram illustrating a DCF mechanism in a wireless LAN system.

FIG. 3 is a diagram illustrating a DCF mechanism in a wireless LAN system.

The DCF performs clear channel assessment (CCA) for sensing a medium for a specific period (e.g., DCF interframe space (DIFS)) before STAs having data to be transmitted transmit the data. At this time, when a medium is idle, an STA may transmit a signal using the medium. However, when the medium is busy, on the assumption that multiple STAs wait to use the medium, data may be transmitted after waiting for a DIFS plus a random backoff period. At this time, the random backoff period enables collision avoidance, because, when it is assumed that multiple STAs for transmitting data are present, the STAs stochastically have different backoff interval values and, as a result, have different transmission times. When one STA starts transmission, the other STAs cannot use the medium.

The random backoff time and procedure will be briefly described as follows.

When a specific medium is changed from a busy state to an idle state, multiple STAs start to prepare for transmission of data. At this time, in order to minimize collision, the STAs, which will transmit data, select random backoff counts and wait for slot times thereof. The random backoff count is a pseudo-random integer value and one of uniformly distributed values in the range of [0 CW] is selected as the random backoff count. CW means "contention window".

A CW parameter takes a CWmin value as an initial value and the value thereof is doubled when transmission fails. For example, when an ACK response to a transmitted data frame is not received, collision may be regarded as occurring. When the CW value has a CWmax value, the CWmax value is maintained until data transmission succeeds and is reset to the CWmin value when data transmission succeeds. At this time, CW, CWmin and CWmax are preferably maintained as $2^n-1$ for convenience of implementation and operation.

When a random backoff procedure is started, an STA selects a random backoff count within the range of [0 CW] and then keeps monitoring the medium while counting down of backoff slot. If the medium switches to the busy state in the meantime, the STA stops counting down the backoff slot. The STA resumes counting down of the residual backoff slot when the medium becomes idle again.

Referring to FIG. 3, when multiple STAs have data to be transmitted, STA3 can immediately transmit a data frame since the medium has been idle for the DIFS, and the other STAs wait for the medium to become idle. Since the medium is busy for a while, STAs may watch for an opportunity to use the medium. Accordingly, each STA selects a random backoff count. In FIG. 3, it can be seen that STA2 having selected the smallest backoff count transmits a data frame.

After transmission from STA2 is finished, the medium switches back to the idle state and STAs resume counting down of the backoff interval. FIG. 3 shows that STA5, which has the second smallest random backoff count after that of STA2 and temporarily stops counting down while the medium is busy, counts down the residual backoff slot and then starts data frame transmission, but collision occurs since the random backoff count of STA5 accidentally overlaps the random backoff count of STA4. In this case, none of the two STAs receives an ACK response after data transmission, and thus the CW is doubled and the STAs reselect random backoff count values.

As mentioned above, carrier sensing forms the basis of CSMA/CA. An STA uses physical carrier sensing and virtual carrier sensing to determine whether a DCF medium is busy/idle. Physical carrier sensing is performed in a PHY (physical) layer through energy detection or preamble detection. For example, upon determining that a receiver has measured a voltage level or read a preamble, the medium may be determined to be busy. Virtual carrier sensing sets a network allocation vector (NAV) to prevent other STAs from transmitting data and is performed according to a duration field value of the MAC header. To decrease collision possibility, a robust collision detect mechanism has been introduced. The reason for this introduction can be found in the following two examples. For simplicity, it is assumed that a carrier sensing range corresponds to a transmit range.

Figure 4:
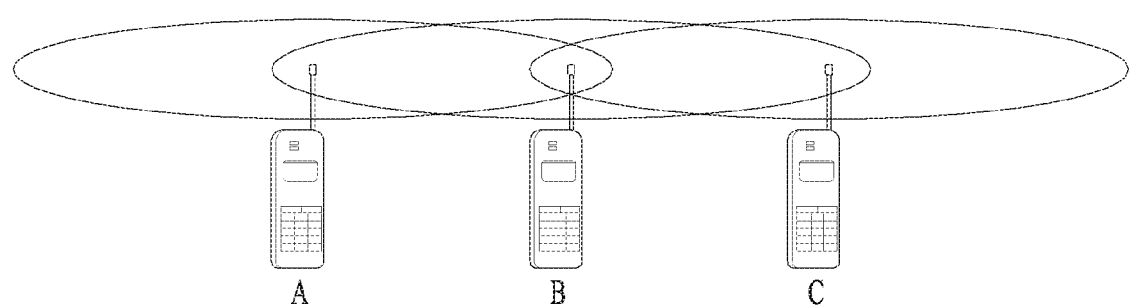
FIGS. 4 and 5 are diagrams illustrating issues of an existing contention resolution mechanism.
Figure 5:
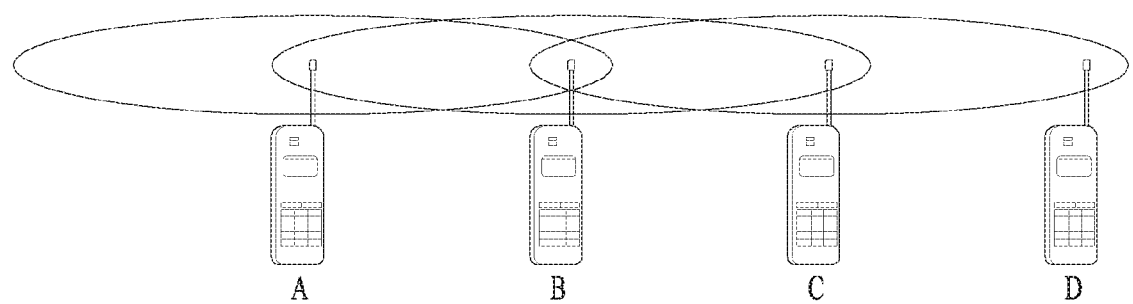

FIGS. 4 and 5 are diagrams illustrating issues of an existing contention resolution mechanism.

Specifically, FIG. 4 illustrates hidden node issues. In this example, STA A and STA B are communicating with each other and STA C has information to be transmitted. Specifically, even though STA A transmits information to STA B, since STA C is outside the transmission range of STA A, STA C may not detect signal transmission of STA A and may consider a medium as idle when performing carrier sensing for the medium before transmitting data to STA B. As a result, collision occurs since STA B receives information from STA A and STA C simultaneously. In this case, STA A can be regarded as a hidden node of STA C.

Meanwhile, FIG. 5 illustrates exposed node issues. STA B is currently transmitting data to STA A. At this time, STA C performs carrier sensing. Since STA B is transmitting information, STA C senses that the medium is busy. As a result, when STA C has data to be transmitted to STA D, STA C is caused to unnecessarily wait for the medium to become idle since STA C senses that the medium is busy. That is, STA A may block STA C from transmitting information even though STA A is located outside the CS range of STA C. In this case, STA C serves as an exposed node of STA B.

To make good use of a collision avoidance mechanism in the aforementioned situation, a short signaling packet such as RTS (request to send) and CTS (clear to send) is introduced such that neighboring STAs can overhear whether two STAs transmit information. That is, once an STA that attempts to transmit data transmits an RTS frame to a receiver STA to receive the data, the receiver STA may signal that the receiver STA will receive data, by transmitting a CTS frame to the neighboring STAs.

Figure 6:
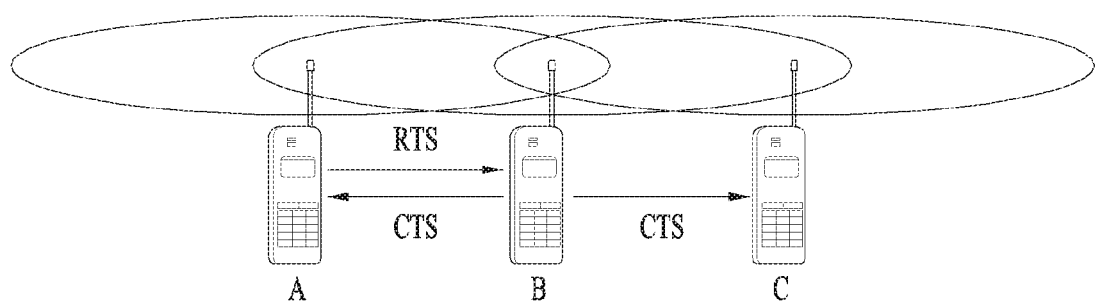
FIG. 6 is a diagram illustrating a mechanism for solving a hidden node issue using an RTS/CTS frame.

FIG. 6 is a diagram illustrating a mechanism for solving a hidden node issue using an RTS/CTS frame.

In FIG. 6, both STA A and STA C attempt to transmit data to STA B. When STA A sends RTS to STA B, STA B transmits CTS to STA A and STA C located therearound. As a result, STA C waits until STA A and STA B finish data transmission. Thereby, collision is avoided.

Figure 7:
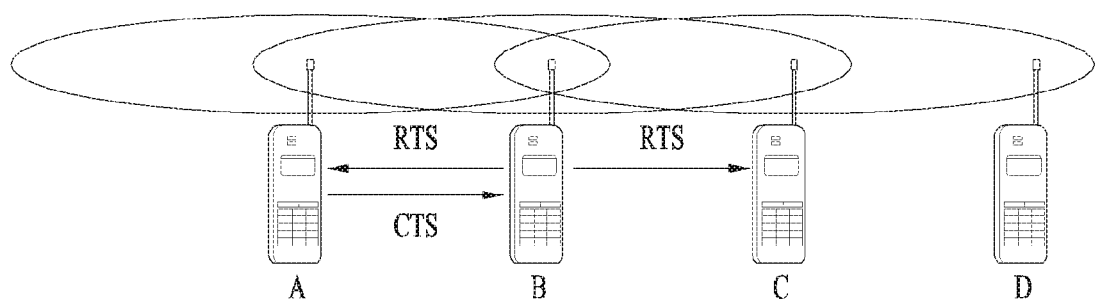
FIG. 7 is a diagram illustrating a mechanism for solving an exposed node issue using an RTS/CTS frame.

FIG. 7 is a diagram illustrating a mechanism for solving an exposed node issue using an RTS/CTS frame.

In FIG. 7, RTS/CTS transmission from STA A and STA B is overheard, and thus collision does not occur even if STA C transmits data to STA D. That is, STA B transmits RTS to all neighboring STAs, and only STA A, which actually has data to send, sends CTS. Since STA C receives only RTS and does not receive CTS from STA A, STA C can recognize that STA A is located outside the CS range of STA C.

Figure 8:
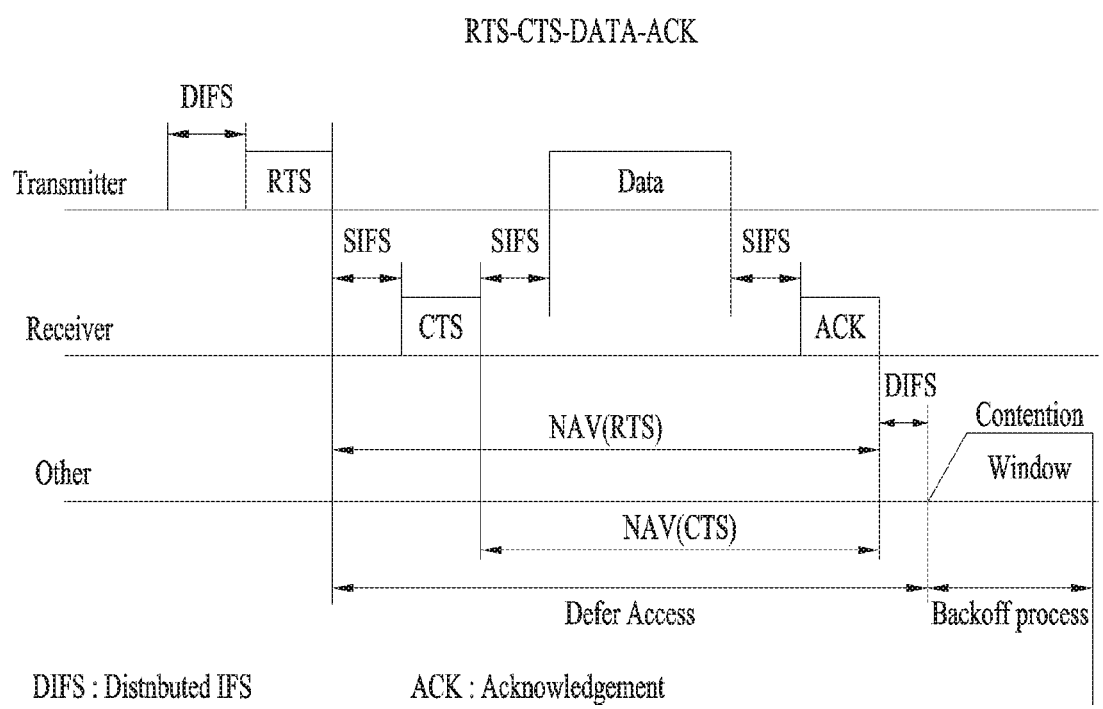
FIG. 8 is a diagram illustrating an operation method using the RTS/CTS frame in detail.

FIG. 8 is a diagram illustrating an operation method using the RTS/CTS frame in detail.

In FIG. 8, a transmitter STA may transmit an RTS frame to a receiver STA, to which a signal will be transmitted, after a distributed IFS (DIFF). The receiver STA, which has received this RTS frame, may transmit CTS to the transmitter STA after a short IFS (SIFS). The transmitter STA, which has received the CTS from the receiver STA, may transmit data after an SIFS as shown in FIG. 8. The receiver STA, which has received the data, may transmit an ACK response to the received data after an SIFS.

Meanwhile, an STA, which has received the RTS/CTS from the transmitter STA, among neighboring STAs other than the transmitter/receiver STA may determine whether the medium is busy depending on whether the RTS/CTS is received or not as described with reference to FIGS. 6 and 7 and set a network allocation vector (NAV). When a NAV period is finished, a contention resolution procedure described above with reference to FIG. 3 may be performed after the DIFS.

Hereinafter, a method of increasing a spatial reuse rate according to the present invention based on the above description will be described.

Figure 9:
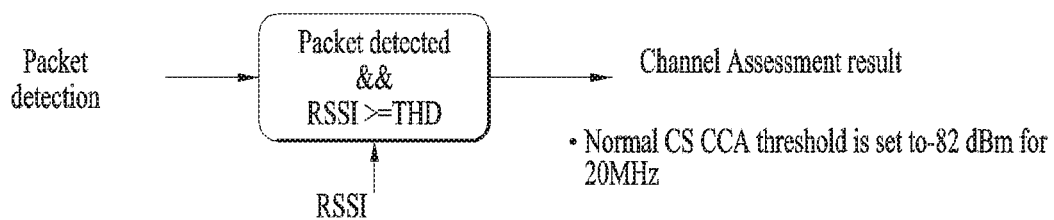
FIG. 9 is a diagram illustrating the concept of general CCA based NAV operation in detail.

FIG. 9 is a diagram illustrating the concept of general CCA based NAV operation in detail.

As described above, an STA performs a backoff procedure in order to access a medium. Whether the medium is idle or busy every time unit is based on a determination as to whether an RSSI of a reception frame exceeds a CCA level which is a predetermined threshold when there is a frame received at a corresponding time.

As shown in FIG. 9, the CCA level used in a wireless LAN system is generally −82 dBm for 20-MHz bandwidth. When the RSSI of the reception frame is equal to or greater than −82 dBm, the STA updates a NAV based on duration field information of the corresponding frame.

In one embodiment of the present invention, an STA determining whether a medium is busy based on a high CCA level with respect to other BSS (OBSS) frame and updating a NAV in order to increase a spatial reuse rate is proposed. Here, the high CCA level used for the OBSS frame is specially defined as an OBSS PD level.

Figure 10:
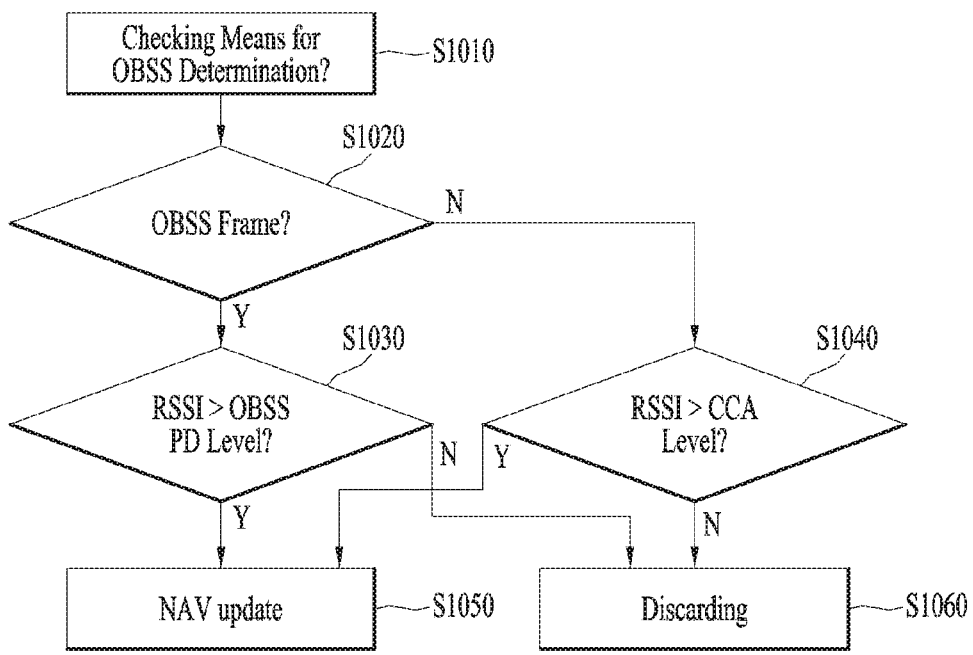
FIG. 10 is a diagram illustrating a method of increasing a spatial reuse rate according to an embodiment of the present invention.

FIG. 10 is a diagram illustrating a method of increasing a spatial reuse rate according to an embodiment of the present invention.

First, when a specific STA (hereinafter, first STA) receives a radio frame from a second STA, the radio frame preferably includes information used to determine whether the received frame is an OBSS frame (S1010) and the first STA may determine whether the received frame is an OBSS frame based on such information (S1020). In general, since any one of RA and TA fields of the frame generally includes a BSSID regardless of whether uplink transmission or downlink transmission is performed, whether the received frame is an OBSS frame may be determined. However, as described below, an RTS frame transmitted on downlink preferably includes additional information for determining whether the received frame is an OBSS frame.

If the received frame is an OBSS frame, the first STA determines whether the RSSI of the received frame is equal to or greater than an OBSS PD level higher than a CCA level (S1030). If the RSSI of the received frame is equal to or greater than the CCA level and is less than or equal to the OBSS PD level, the first STA may not update the NAV according to the frame (S1050) and discard the information (S1060).

If the received frame is a frame of a BSS, to which the first STA belongs, the first STA may compare the RSSI of the received frame with the CCA level (S1040) and, if the RSSI is equal to or greater than the CCA level, the NAV may be updated (S1050) and, if the RSSI is equal to or less than the CCA level, the information may be discarded (S1060).

Figure 11:
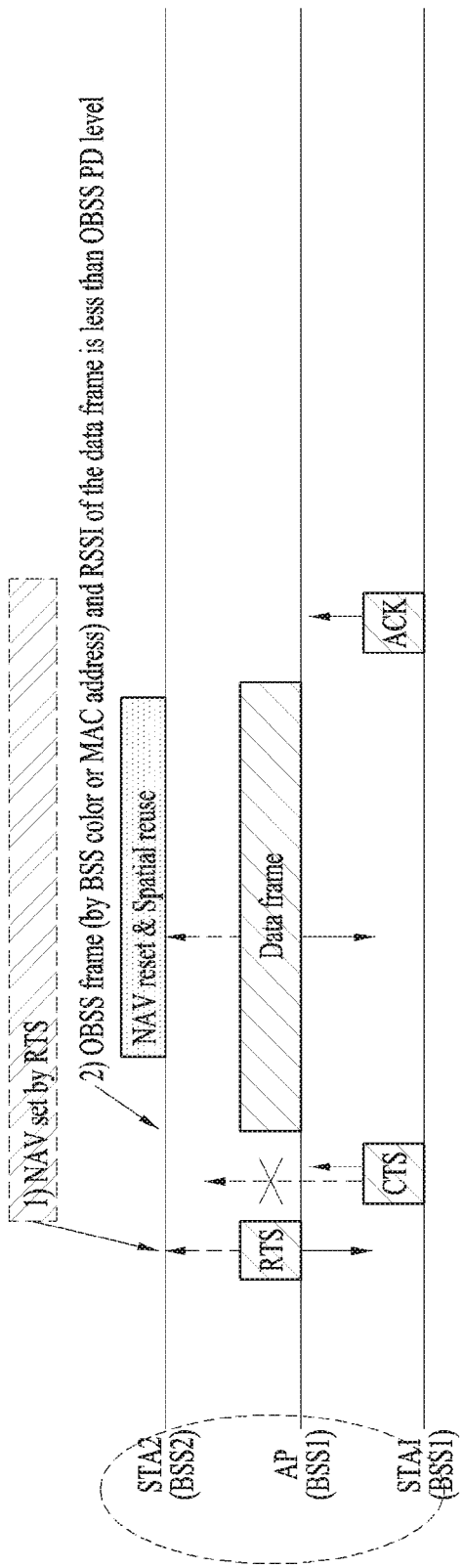
FIG. 11 is a diagram showing an embodiment of exchanging an RTS/CTS frame using the method described with reference to FIG. 10.

FIG. 11 is a diagram showing an embodiment of exchanging an RTS/CTS frame using the method described with reference to FIG. 10.

As shown in FIG. 11, assume that an AP and STA1 belong to BSS1 and STA2 belongs to BSS2. In addition, as shown in FIG. 11, assume that STA2 is located close to the AP and is located far away from STA1.

In order for the AP to transmit data to STA1 on downlink, the AP may transmit an RTS frame to STA1. At this time, the transmitted RTS frame may be transmitted not only to STA1 but also to STA2 located close to the AP.

Assume that the RTS/CTS frame according to the present embodiment includes information for determining whether the RTS/CTS frame is an OBSS frame. In the case of the RTS frame, since the address of the TA field indicates a BSSID, STA2 may determine that the RTS frame is an OBSS frame and thus compare the RSSI of the RTS frame with the OBSS PD level. FIG. 11 shows an example in which the RSSI of the RTS frame is equal to or greater than the OBSS PD level as the result determined by STA2 such that STA2 sets a NAV.

Hereinafter, STA2, which has received the RTS frame from the AP, may transmit a CTS frame to the AP. At this time, the transmitted CTS frame may reach STA2.

Assume that the CTS frame according to the present embodiment includes information for determining whether the CTS frame is an OBSS frame. FIG. 11 shows an example in which the CTS frame includes a BSS color or a MAC address. In the example of FIG. 11, STA2, which has received the CTS frame, may determine that the CTS frame is an OBSS frame and the RSSI is equal to or less than the OBSS PD level and discard CTS frame reception information.

Therefore, STA2 may reset the NAV set by the RTS when the CTS frame is not received within a predetermined period after receiving the RTS frame and transmit a data frame through the medium at the corresponding point of time.

This can increase a spatial reuse rate as compared to the case of using the existing CCA.

The embodiment of the present invention is summarized as follows.

In the basic operation of an existing wireless LAN system, an STA determines whether a radio channel is idle before the radio channel is used and uses the channel only when the channel is idle. Such a determination as to whether the channel is busy or idle is referred to as clear channel assessment (CCA). After a CCA threshold is determined by a system, the channel is regarded as being busy when the strength (RSSI) of an incoming signal exceeds the CCA threshold and is regarded as being idle when the strength of the incoming signal is less than the CCA threshold. The CCA threshold differs according to bandwidth or a primary channel/secondary channel and CCA thresholds corresponding to signal detection and energy detection differ. For example, in a legacy system (e.g., 11a/b/g/n/ac), for 20-MHz bandwidth, since the primary channel is set to −82 dBm in the case of signal detection (or packet detection), it is determined that the channel is idle when a signal having a strength equal to or less than −82 dBm is received and is busy when a signal having a strength greater than −82 dBm is received.

Since use of the channel is determined based on such CCA, like the above-described exposed terminal problem, even though the STA may transmit a frame, it may be determined that the channel is busy by the CCA and thus the frame may not be transmitted, thereby decreasing wireless LAN performance. As a method of suppressing this, when the CCA value is set to a value higher than an existing CCA threshold, STAs may have more opportunities to perform transmission as compared to the existing method. However, in this case, since transmission of other STAs may be influenced, the CCA is set to an appropriate value and should not be increased in some cases.

Increasing of the CCA threshold is not applied to a packet transmitted in my BSS but is applied to a packet transmitted in other BSS. In order to determine whether a packet is my BSS packet or other BSS packet, a BSSID (a receiver address in case of UL and a sender address in case of DL) in an address field of a MAC header is checked or BSS color information (that is, a short ID of a BSS) included in an HE-SIG is checked when transmission is performed in an HE PPDU format.

Since a NAV is set when an RTS or CTS frame is received, after the NAV is set by the RTS/CTS frame, whether data is an OBSS packet or my BSS packet is determined and thus spatial reuse may be impossible. As another method, like the above-described embodiment, whether a packet is an OBSS packet or a my BSS packet is determined with respect to the RTS/CTS frame and whether the RTS/CTS frame is dropped or not (that is, the NAV is set or not using a duration field included in the RTS/CTS frame) is determined using the CCA threshold which is set to be higher than the existing CCA threshold) of the OBSS packet.

By applying the above-described OBSS PD level to the RTS/CTS frame, such that the OBSS PD level is not applied (that is, the NAV is set) in the case of my BSS packet and the OBSS PD level is applied to drop the frame in the case of the OBSS packet. In the case of the RTS frame, since one of an RA or a TA is a BSSID (TA is a BSSID in the case of DL and the RA is a BSSID in the case of UL), if any one of two addresses is not equal to my BSSID, the RTS frame may be regarded as an RTS frame of other BSS. However, in the case of the CTS frame, since only the RA is included, it is difficult to determine whether the CTS frame is transmitted by the STA of my BSS or other BSS.

Figure 12:
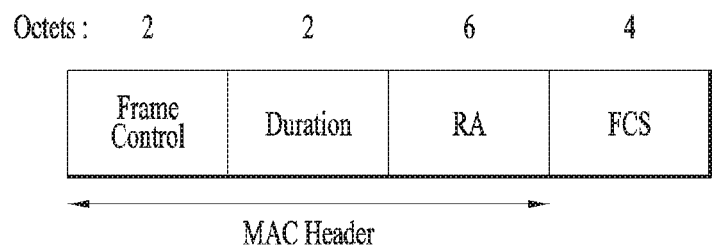
FIG. 12 is a diagram illustrating the structure of a CTS frame in detail.

FIG. 12 is a diagram illustrating the structure of a CTS frame in detail.

As shown in FIG. 12, the CTS frame may include a frame control field having a length of 2 octets, a duration field having a length of 2 octets, an RA field having a length of 6 octets and an FCS field having a length of 4 octets. The RA field of the CTS frame may include the duplication of the TA field of the RTS.

However, as shown in FIG. 12, since the CTS frame does not include the TA field unlike the RTS frame, if the CTS frame is transmitted on uplink, the address of the AP may be included to determine whether the CTS frame is an OBSS frame. However, if the CTS frame is transmitted on downlink, it is difficult to determine whether the CTS frame is an OBSS frame.

As a method of easily solving this, a new CTS always including a BSSID is defined. Through the BSSID included in the new CTS, an STA may determine whether a frame is my BSS frame or an OBSS frame. However, since the BSSID is added, the size of the new CTS frame is greater than that of the existing CTS frame and a transmission time thereof is increased.

In an existing system, when STAs do not receive any frame within a specific time after receiving the RTS frame, operation for resetting a NAV set by RTS (that is, setting to 0) is performed. When the size of the CTS frame is increased, since a data frame transmitted after RTS is always transmitted after exceeding a predetermined time, STAs, which are not receivers of RTS/DATA, may always reset the NAV set by RTS.

Hereinafter, a method of spatially reusing a CTS frame without causing the above-described problems will be described.

Figure 13:
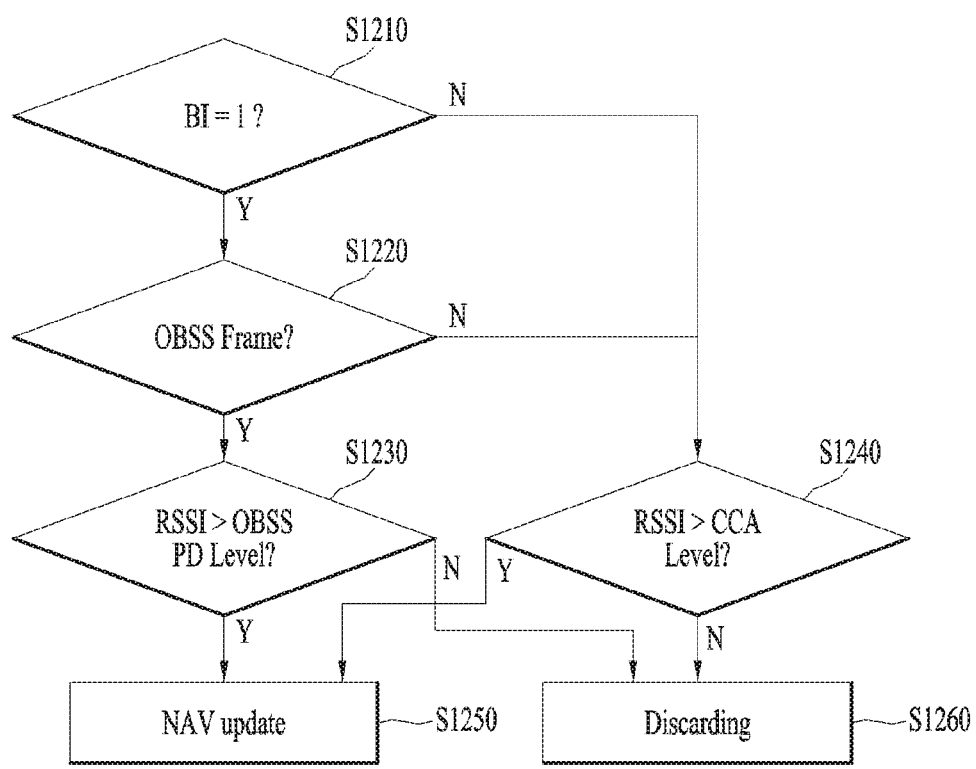
FIG. 13 is a diagram illustrating a method of utilizing an indicator indicating whether an RA is a BSSID in CTS according to an embodiment of the present invention.

FIG. 13 is a diagram illustrating a method of utilizing an indicator indicating whether an RA is a BSSID in CTS according to an embodiment of the present invention.

In the present embodiment, a field indicating whether the RA is a BSSID or not in CTS is referred to as a BSSI indicator (BI). Assume that 1 is set and transmitted if the RA is set to a BSSID and 0 is set and transmitted if the RA is not set to a BSSI. The BSSID indicator may also be referred to as an uplink frame indicator. In the case of the uplink frame of the CTS frame (that is, Uplink frame indicator=1), since the RA is set to a BSSID, STAs, which have received this, may determine whether the CTS frame is a BSS frame or not and apply an OBSS PD level to determine whether a channel is busy or not or whether a NAV is updated or not in the case of an OBSS frame.

That is, at this time (Indicator=1), it is determined that the frame is my BSS frame (or Intra-BSS frame) when the RA is equal to my BSSID and it is determined that the frame is an OBSS frame (or Inter-BSS frame) when the RA is not equal to my BSSID.

A first STA, which has received the CTS frame, determines whether the BI of the CTS frame is 1 (S1210). In general, in the case of DL, the field is set to 0 and, in the case of UL, the field is set to 1. If the field is set to 1, the first STA determines whether the CTS frame is an OBSS frame using the RA field (that is, BSSI information) of the CTS frame (S1220) and compare the RSSI of the CTS frame with an OBSS PD level when the CTS frame is the OBSS frame (S1230). If the BI of the CTS frame is not 1 (S1210) or if BI is 1 but the frame is the OBSS frame as the result of determination based on the BSSID of the CTS frame (S1220), the first STA compares the RSSI of the CTS frame with an existing CCA level (S1240) and updates the NAV if the RSSI is equal to or greater than the CCA level (S1250).

That is, according to the above-described embodiment, when the CTS frame is received, if the BI field is set to 1 and the strength of the signal of the received CTS frame is less than the OBSS PD level, the first STA drops the CTS frame and does not set or update the NAV with the duration included in the CTS frame (S1260).

Figure 14:
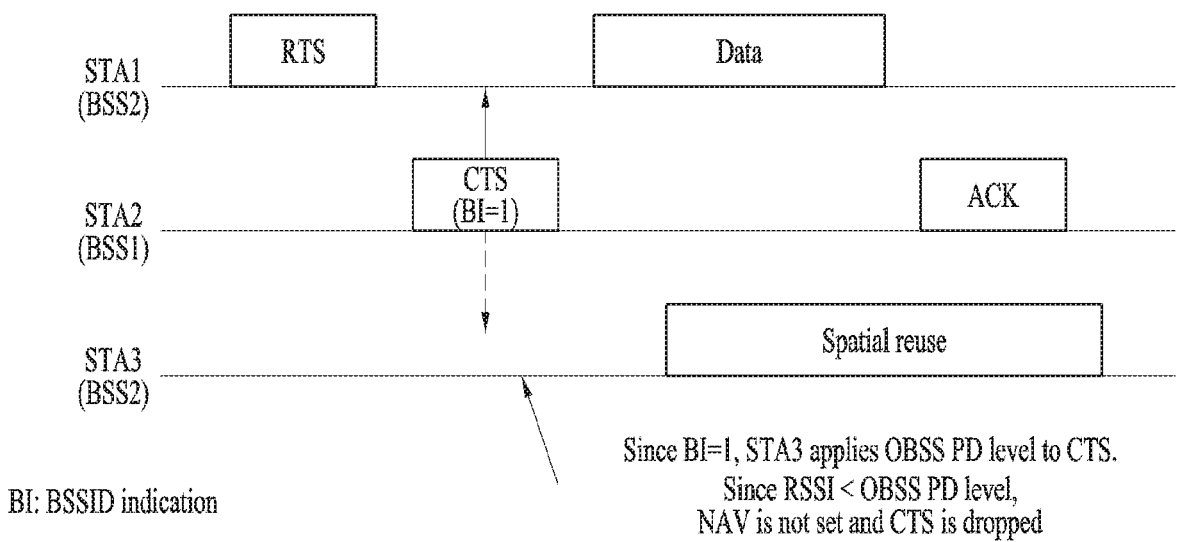
FIG. 14 is a diagram illustrating an embodiment of performing NAV operation using the method described with reference to FIG. 13.

FIG. 14 is a diagram illustrating an embodiment of performing NAV operation using the method described with reference to FIG. 13.

STA1 may transmit an RTS frame and, after a predetermined time, STA2 may transmit a CTS frame. At this time, in FIG. 14, assume that BI=1 in the CTS frame transmitted by STA2. Since BI=1, STA3, which has received the CTS frame, may determine whether the CTS frame is an OBSS frame. Since the CTS frame is a frame of BSS1, the RSSI of the CTS frame may be determined based on an OBSS PD level.

As shown in FIG. 14, if RSSI<OBSS PD level, STA3 may not set a NAV and may drop the CTS frame. Therefore, STA3 may access the medium through spatial reuse at a corresponding time.

In the above-described embodiment, the BI (BSSID Indication) field may use an unused field. For example, among the fields included in the Frame Control field of FIG. 12, one of To DS, From DS, More Fragments, Retry, Power Management, Protected Frame, and Order fields may be used to indicate that the RA is a BSSID. Alternatively, in the other parts (e.g., Service field, duration, etc.) of the CTS frame, an unused bit may be used to indicate that the RA is a BSSID.

In another embodiment of the present invention, instead of a BI field indicating that the RA is a BSSID in the CTS, a field for allowing spatial reuse with respect to the CTS frame, e.g., a Spatial Reuse Allowed field, may be used. That is, when the field (Spatial Reuse Allowed) is set to 1, spatial reuse is allowed with respect to transmission of the CTS frame.

Such a Spatial Reuse Allowed part may have the same meaning even in an RTS frame. When an unused field/bit of the RTS frame is used as a Spatial Reuse Allowed field and the field is set to 1, an STA applies a spatial reuse rule to the RTS frame. That is, whether the RTS frame is an OBSS frame is determined, and if the RTS frame is an Inter-BSS (OBSS) frame and the signal strength of the RTS is lower than an OBSS PD level, a NAV may not be set/updated using the corresponding frame and the RTS may be dropped.

Meanwhile, in another embodiment of the present invention, a BSS color is included in a CTS frame.

Figure 15:
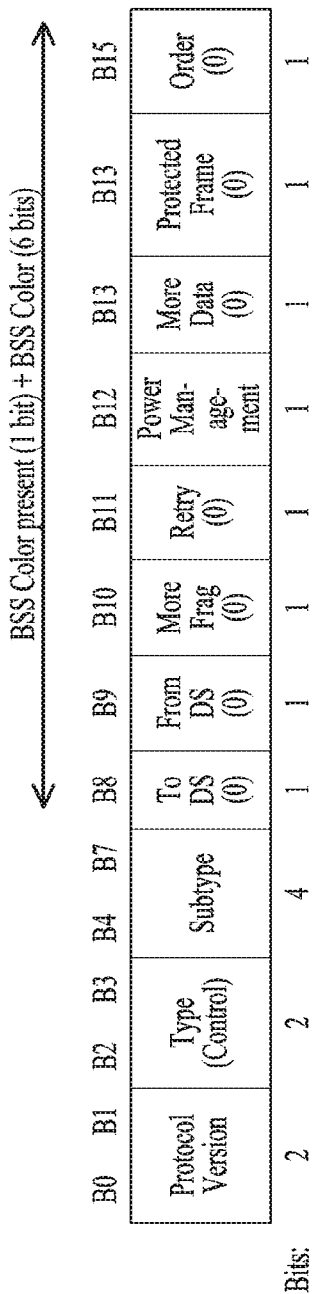
FIG. 15 is a diagram illustrating a method of including a BSS color in a CTS frame according to an embodiment of the present invention.

FIG. 15 is a diagram illustrating a method of including a BSS color in a CTS frame according to an embodiment of the present invention.

Instead of including the BSS color in the CTS frame shown in FIG. 12, in the present embodiment, an unused field of the CTS frame is reused and is used as a BSS color. A specific field may be set to indicate whether a BSS color is included in the CTS frame. That is, if the field indicates that the BSS color is included, a BSS color is included in a CTS frame.

A BSS Color presence field may use an unused field. For example, FIG. 15 shows a frame control field of the CTS frame structure shown in FIG. 12, in which any one of To DS, From DS, More Fragments, Retry, Power Management, Protected Frame, and Order fields starting from B8 in the frame control field may be used as a BSS Color presence field. In addition, some (e.g., 6 bits or less (e.g., 3 to 4 bits)) of the To DS, From DS, More Fragments, Retry, Power Management, Protected Frame, and Order fields may be used as a BSS color.

Alternatively, some bits of a service field may be used as a BSS Color. If the BSS Color presence field is set to 1, all or some of bits 0 to 5 of the service field may be used as a BSS color. A Spatial Reuse Allowed field may be used instead of the BSS Color presence field. That is, when the Spatial Reuse Allowed field is set to 1, spatial reuse is allowed with respect to the CTS frame, and the BSS Color may be transmitted in an unused field of the CTS frame. An STA may determine whether a frame is transmitted in an Inter-BSS (OBSS) through the BSS Color and apply an OBSS PD level.

Figure 16:
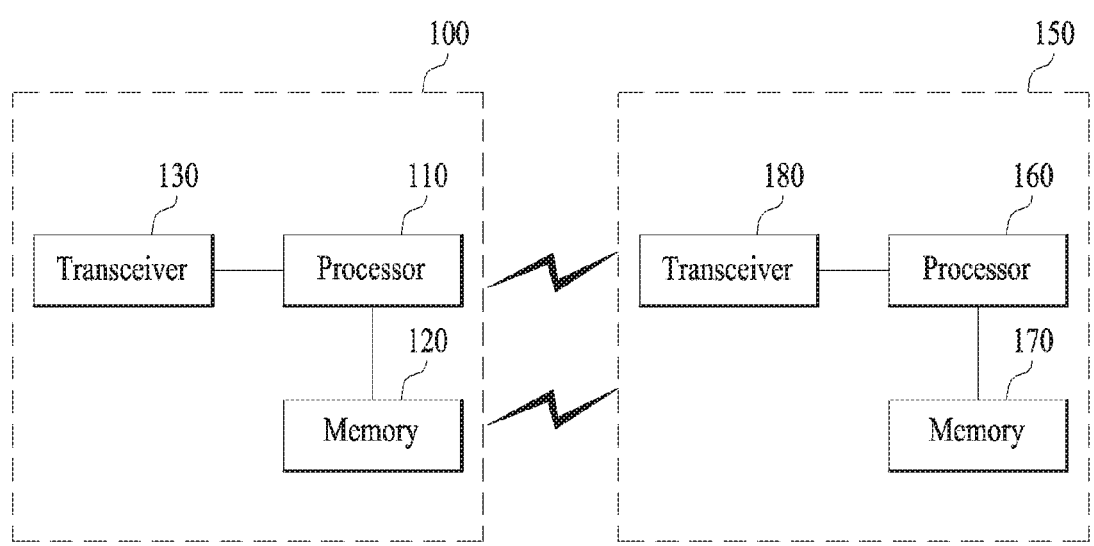
FIG. 16 is a diagram illustrating an apparatus for implementing the above-described method.

FIG. 16 is a diagram illustrating an apparatus for implementing the above-described method.

A wireless apparatus 800 of FIG. 16 may correspond to a specific STA of the above description and a wireless apparatus 850 may correspond to an AP of the above description.

The STA 800 may include a processor 810, a memory 820 and a transceiver 830, and the AP 850 may include a processor 860, a memory 870 and a transceiver 880. The transceivers 830 and 880 may transmit and receive wireless signals and may be executed at a physical layer of IEEE 802.11/3GPP. The processors 810 and 860 may be executed at a physical layer and/or a MAC layer and connected to the transceivers 830 and 880. The processors 810 and 860 may perform the above-described UL MU scheduling procedure.

The processors 810 and 860 and/or the transceivers 830 and 880 may include application-specific integrated circuits (ASICs), other chipsets, logical circuits and/or data processors. The memories 820 and 870 may include read-only memory (ROM), random access memory (RAM), flash memory, memory cards, storage media and other storage units. When an embodiment is executed by software, the above-described method may be executed as modules (e.g., a processor or a function) for performing the above-described function. The modules may be stored in the memories 820 and 870 and may be executed by the processors 810 and 860. The memories 820 and 870 may be provided inside or outside the processors 810 and 860 and may be connected to the processors 810 and 860 by well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit and scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the present invention is applied to an IEEE 802.11 based wireless LAN system, the present invention is not limited thereto. The present invention is equally applicable to various wireless systems which may use the above-described spatial reuse method.

What is claimed is:

1. A method of operating a network allocation vector (NAV) of a first station (STA) operating in a wireless local area network (WLAN) system, the method comprising:
receiving a request to send (RTS) frame from a second STA;
receiving a clear to send (CTS) frame including a one-bit flag from a third STA;
determining whether the one-bit flag of the CTS frame has a first value or a second value;
determining whether a received signal strength indicator (RSSI) of the CTS frame is equal to or greater than a first clear channel assessment (CCA) level, when the one-bit flag of the CTS frame has the first value, or when the one-bit flag of the CTS frame has the second value but the CTS frame is determined as a frame of a basic service set (BSS) to which the first STA belongs based on contents of the CTS frame;

determining whether the RSSI of the CTS frame is equal to or greater than a second CCA level higher than the first CCA level, when the one-bit flag of the CTS frame has the second value, and when the CTS frame is determined not the frame of the BSS to which the first STA belongs; and updating the NAV of the first STA when the RSSI of the CTS frame is equal to or greater than the first CCA level or the second CCA level.

2. The method according to claim 1, wherein the one-bit flag of the CTS frame corresponds to an indicator indicating whether the CTS frame includes a BSSID (Basic Service Set Identifier).

3. The method according to claim 2, wherein, when the CTS frame is a CTS frame transmitted on uplink, the indicator has the second value and, when the CST frame is a CTS frame transmitted on downlink, the indicator has the first value.

4. The method according to claim 3,
wherein, when the indicator has the first value, the second STA determines whether the CTS frame is the frame of the BSS, to which the first STA belongs, through the BSSID included in a receiver address (RA) of the CTS frame and compares the RSSI of the CTS frame with the first CCA level or the second CCA level, and wherein, when the indicator has the first value, the first STA compares the RSSI of the CTS frame with the second CCA level.

5. A first station (STA) apparatus operating in a wireless local area network (WLAN) system, the first STA apparatus comprising:
a transceiver configured to receive a request to send (RTS) frame and a clear to send (CTS) frame including one-bit flag from another STAs; and
a processor connected to the transceiver and configured to control network allocation vector (NAV) operation, wherein the processor is configured to:
determine whether the one-bit flag of the CTS frame has a first value or a second value;
determine whether a received signal strength indicator (RSSI) of the CTS frame is equal to or greater than a first clear channel assessment (CCA) level, when the one-bit flag of the CTS frame has the first value, or when the one-bit flag of the CTS frame has the second value but the CTS frame is determined as a frame of a basic service set (BSS) to which the first STA belongs based on contents of the CTS frame,
determine whether the RSSI of the CTS frame is equal to or greater than a second CCA level higher than the first CCA level, when the one-bit flag of the CTS frame has the second value, and when the first frame is determined not the frame of the BSS to which the first STA belongs, and
update the NAV of the first STA when the RSSI of the CTS frame is equal to or greater than the first CCA level or the second CCA level.

6. The first STA apparatus according to claim 5, wherein the one-bit flag of the CTS frame corresponds to an indicator indicating whether the CTS frame includes a BSSID (Basic Service Set Identifier).

7. The first STA apparatus according to claim 6, wherein, when the CTS frame is a CTS frame transmitted on uplink, the indicator has the second value and, when the CST frame is a CTS frame transmitted on downlink, the indicator has the first value.

8. The first STA apparatus according to claim 7,
wherein, when the indicator has the second value, the processor is further configured to determine whether the CTS frame is the frame of the BSS to which the first STA belongs, through the BSSID included in a receiver address (RA) of the CTS frame and compare the RSSI of the CTS frame with the first CCA level or the second CCA level, and wherein, when the indicator has the first value, the processor is further configured to compare the RSSI of the CTS frame with the second CCA level.

* * * * *